United States Patent [19]

Hayasaki

[11] Patent Number: 4,765,202
[45] Date of Patent: Aug. 23, 1988

[54] ENGINE BRAKE CONTROL FOR AUTOMATIC TRANSMISSION

[75] Inventor: Koichi Hayasaki, Fujisawa, Japan

[73] Assignee: Nissan Motor Co., Ltd., Yokohama, Japan

[21] Appl. No.: 890,371

[22] Filed: Jul. 29, 1986

[30] Foreign Application Priority Data

Jul. 30, 1985 [JP] Japan ................. 60-166646

[51] Int. Cl.⁴ ............................................. B60K 41/04
[52] U.S. Cl. ................................ 74/868; 74/752 C
[58] Field of Search .............. 74/867, 868, 869, 752 C

[56] References Cited

U.S. PATENT DOCUMENTS

| | | | |
|---|---|---|---|
| 3,631,950 | 1/1972 | Tanaka | 74/752 C |
| 3,938,410 | 2/1976 | Dach et al. | 74/869 |
| 4,103,764 | 8/1978 | Iijima | 74/866 |
| 4,395,926 | 8/1983 | Kubo et al. | 74/869 |
| 4,445,401 | 5/1984 | Ishimaru | 74/869 |
| 4,485,695 | 12/1984 | Kawamoto | 74/752 C |
| 4,501,174 | 2/1985 | Sugano | 74/869 |
| 4,537,095 | 8/1985 | Morisawa | 74/868 |
| 4,566,355 | 1/1986 | Sugano | 74/869 |
| 4,580,466 | 4/1986 | Iwanaga | 74/869 X |
| 4,680,992 | 7/1987 | Hayasaki et al. | 74/869 |

OTHER PUBLICATIONS

General Motors Corporation, H 700-R4-195-7/83, p. 68; "Complete Hydraulic Oil Circuits".

*Primary Examiner*—Leslie A. Braun
*Assistant Examiner*—David Novais
*Attorney, Agent, or Firm*—Foley & Lardner, Schwartz, Jeffery, Schwaab, Mack, Blumenthal & Evans

[57] ABSTRACT

An engine brake control comprises a pressure reduction valve which effects pressure reduction on hydraulic fluid pressure supplied to an engine brake friction element for activation thereof by discharging hydraulic fluid from the engine brake friction element. The engine brake friction element is to be activated to effect engine brake during operation with each of various speeds. The pressure reduction valve is operative to effect the pressure reduction when a first predetermined drive range (D range) is selected, while it is rendered inoperative to prevent the pressure reduction when a second predetermined drive range (II range) is selected.

5 Claims, 3 Drawing Sheets

FIG.2

| RANGE | FRICTION ELEMENT SPEED | F/C | H/C | R/C | OR/C | B/B | LR/B | FO/C | LO/C |
|---|---|---|---|---|---|---|---|---|---|
| D | 1 SPEED | ○ | × | × | × | × | × | ○ | ○ |
| D | 2 SPEED | ○ | × | × | × | ○ | × | ○ | × |
| D | 3 SPEED | ○ | ○ | × | × | × | × | ○ | × |
| D | 4 SPEED | ○ | ○ | × | × | ○ | × | × | × |
| III | 1 SPEED | ○ | × | × | ○ | × | × | × | × |
| III | 2 SPEED | ○ | × | × | ○ | ○ | × | × | × |
| III | 3 SPEED | ○ | ○ | × | ○ | × | × | × | × |
| II | 1 SPEED | ○ | × | × | ○ | × | × | × | × |
| II | 2 SPEED | ○ | × | × | ○ | ○ | × | × | × |
| I | 1 SPEED | ○ | × | × | ○ | × | ○ | × | × |
| R | REV. | × | × | ○ | × | × | ○ | × | × |
| P, N | | × | × | × | × | × | × | × | × |

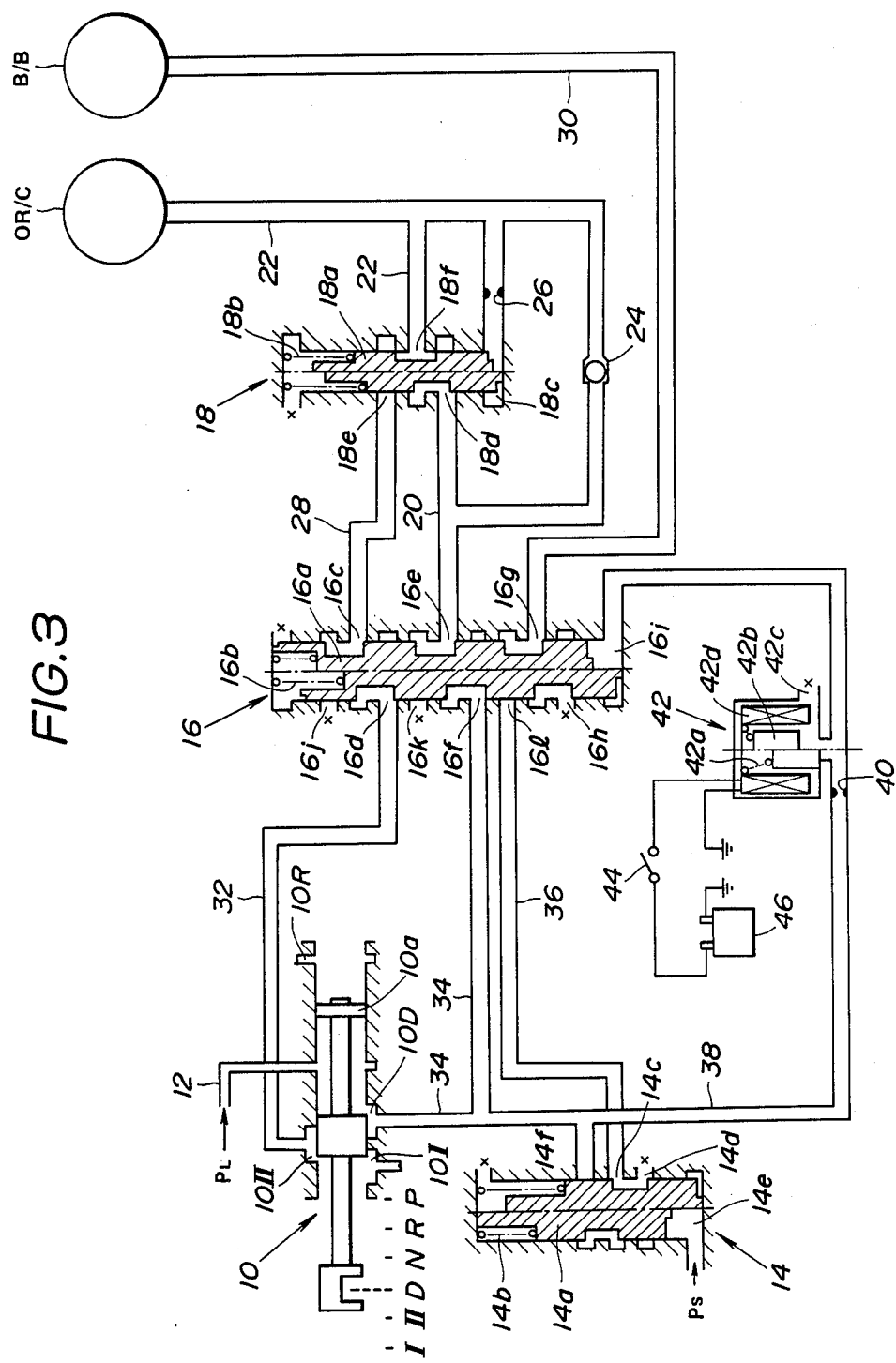

ENGINE BRAKE CONTROL FOR AUTOMATIC TRANSMISSION

COPENDING RELATED APPLICATIONS

Reference should be made to the following copending U.S. applications which have been assigned to the assignee of the present application.

U.S. application Ser. No. 885,136, filed July 14, 1986 claiming priority of Japanese Patent Application No. 60-171866 filed on Aug. 6, 1985:

U.S. application Ser. No. 885,135 filed July 14, 1986 claiming priority of Japanese Patent Application No. 60-154244 filed on July 15, 1985:

U.S. application Ser. No. 890,370, filed July 29, 1986 claiming priority of Japanese Patent Application No. 60-166647 filed on July 30, 1985:

U.S. application Ser. No. 893,243, now U.S. Pat. No. 4,680,992 claiming priority of Japanese Patent Applications No. 60-171154 filed on Aug. 5, 1985, No. 60-171865 filed on Aug. 6, 1985, No. 60-171869 filed on Aug. 6, 1985, and No. 60-197078 filed on Sept. 6, 1985;

U.S. application Ser. No. 905,078 filed Sept. 9, 1986 claiming priority of Japanese Patent Applications No. 60-199318 filed on Sept. 11, 1985, and No. 60-199319 filed on Sept. 11, 1985.

BACKGROUND OF THE INVENTION

The present invention relates to an engine brake control in an automatic transmission.

Automatic transmissions effect a shift between various speeds having different gear ratios by a change-over in the power delivery path after selective actuation of one or more kinds of friction elements. It is the commonly employed practice to provide a one-way clutch which serves as a reaction member against a rotary member to establish a power delivery path.

With this one-way clutch, if the rotary member is subject to reverse torque, the one-way clutch is released to interrupt the transmission of this reverse torque. However, since the one-way clutch interrupts the transmission of reverse torque, no effective engine braking results.

Thus, a known automatic transmission is provided with a friction element which is arranged in parallel to a one-way clutch such that the friction element is activated to effect engine braking when a driver places a manual selector valve at a predetermined drive range position.

In the case of known automatic transmission of the THM-700 type manufactured by General Motors Corporation in the United States, a single friction element is commonly used in effecting engine braking during running with each of a plurality of speeds and the required capacity of this friction element for engine braking operation during running with the highest speed is considerably small as compared to the required capacity for engine braking operation during running with a speed lower than this highest speed.

In order to tailor the capacity of the engine brake friction element with the required capacity for running with each speed, it has been the conventional practice to use normal line pressure as the working hydraulic fluid pressure for activating the friction element when engine braking is to be effected during running with the highest speed and boost the line pressure when engine braking is to be effected during running with a speed other than the highest speed.

However, since the line pressure is used as the working hydraulic fluid pressure for activating friction elements other than the engine brake friction element, it has been impossible to set the line pressure at a low level which would provide the engine brake friction element with the required capacity for effecting engine braking operation during running with the highest speed. Thus, there has arisen a problem that when engine braking is to be effected during running with the highest speed by activation of the engine brake friction element with the normal line pressure, substantial shocks take place upon effecting the engine brake operation because the engine brake friction element is provided with an overabundance in capacity.

An object of the present invention is to solve the above mentioned problem encountered in the conventional engine brake control in automotive automatic transmission.

More particularly, an object of the present invention is to provide an engine brake control wherein a shift to engine brake operation is made without substantial shocks.

SUMMARY OF THE INVENTION

An engine brake control according to the present invention is provided in an automatic transmission for an automative vehicle having an engine. The automatic transmission includes an engine brake friction element which is to be activated to effect engine brake during operation with each of various speeds, a capacity required by the engine brake friction element to effect engine brake during operation with the highest one of the various speeds being smaller than a capacity required by the engine brake friction element to effect engine brake during operation with another of the various speeds. The engine brake control comprises:

means for causing the automatic transmission to shift to the highest one of the various speeds to effect engine brake during operation with the highest one of the various speeds by hydraulically activating the engine brake friction element when a first predetermined drive range is selected and causing the automatic transmission to shift to the another of the various speeds to effect engine brake during operation with the another of the various speeds by hydraulically activating the engine brake friction element when a second predetermined drive range is selected;

means for effecting pressure reduction on hydraulic fluid pressure supplied to the engine brake friction element for activation thereof by discharging hydraulic fluid from said engine brake friction element; and means for rendering said pressure reduction effecting means inoperative to prevent discharging of hydraulic fluid from said engine brake friction element when said second predetermined drive range is selected, whereby hydraulic fluid pressure which is not subject to the pressure reduction is supplied to the engine brake friction element for activation thereof when said second predetermined drive range is selected.

Specifically, the present invention provides an engine brake control wherein, in order to adjust the capacity of an engine brake friction element to a capacity required by the engine brake friction element for effecting engine brake during operation with various speeds, rather than using a line pressure for activation of the engine brake friction element during running with the highest one of the various speeds, a pressure reduction is effected on the line pressure to provide a hydraulic fluid pressure having a predetermined low value upon causing the automatic transmission to shift to the highest one of the various speeds to effect engine brake during running with the highest speed, while such pressure reduction is not effected to allow the line pressure to activate the engine brake friction element during operation with another of the various speeds. A pressure reduction valve is fluidly disposed in a circuit for activating the engine brake friction element. The pressure reduction valve is operative to discharge hydraulic fluid from the circuit via a drain port to effect the pressure reduction. The drain port is operative during operation with the highest speed, but it is supplied with a hydraulic fluid pressure that is generated when the automatic transmission is to shift to the another of the various speeds to effect engine brake during operation with the another of the various speeds. The pressure reduction by the pressure reduction valve is prevented when the drain port is supplied with the hydraulic fluid pressure.

BRIEF DESCRIPTION OF THE DRAWINGS

FIG. 2 illustrates the pattern of engagement and disengagement of the various friction elements in different speeds of the transmission shown in FIG. 1; and FIG. 3 is a diagram showing one embodiment of an engine brake control according to the present invention.

DESCRIPTION OF THE EMBODIMENT

Figure 1:
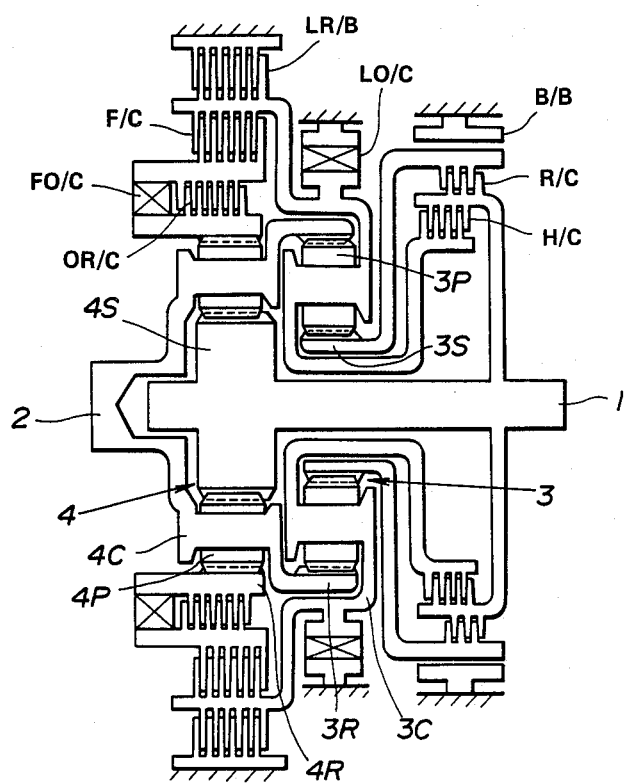
FIG. 1 is a schematic view of a transmission.

Referring to FIG. 1, the transmission illustrated herein is described in copending U.S. application Ser. No. 885,136 filed on July 14, 1986 claiming priority of Japanese Patent Application No. 60-171866 filed on Aug. 6, 1985. This U.S. application is assigned to the same assignee of the present application, and it has been incorporated by reference in its entirety. Referring to FIG. 2, friction elements which are to be activated or engaged are denoted by the reference character o, while friction elements which are not to be activated or released are denoted by the reference character x. FIG. 2 shows the pattern of engagement and disengagement of various friction elements in different speeds of the transmission shown in FIG. 1.

Referring to FIG. 3, there is diagrammatically shown, as an engine brake friction element, an overrun clutch OR/C which is arranged in parallel to a forward one-way clutch FO/C in the automatic transmission shown in FIG. 1 and which is adapted to effect engine braking when it is activated or engaged. Also shown is a band brake B/B, as a shifting friction element. As will be understood from FIG. 2, the band brake B/B is activated or engaged to effect an upshift from the 3rd speed to the 4th speed, while it is released to effect a downshift from the 4th speed to the 3rd speed.

Referring to FIG. 3, there are diagrammatically shown, as a shifting friction element, the above mentioned band brake B/B which is activated or engaged to establish the 4th speed in cooperation with activation of a front clutch F/C and a high clutch H/C as will be understood from FIG. 2, and as an engine brake friction element, the above mentioned overrun clutch OR/C which is activated or engaged for engine brake operation with any one of the 1st to 3rd speeds as will be understood from FIG. 2. For shifting from the 4th speed to the 3rd speed, the shifting friction element B/B is deactivated. The capacity required by the engine brake friction element OR/C varies with a speed ratio with which engine braking is effected such that the capacity required during engine brake with the 3rd speed is smaller than the capacity required during engine brake with the other two speed ratios including the 2nd and 1st speeds.

A manual selector valve 10 includes a spool 10a which is manually movable to P range when a driver wishes to park an automotive vehicle, R range when he/she wishes to drive the vehicle in the reverse direction, N range when he/she wishes to establish the neutral in the automatic transmission, D range when he/she wishes automatic shift in the transmission during the forward drive, II range when he/she wishes an engine brake to be effected with the 2nd speed, and I range when he/she wishes an engine brake to be effected with the 1st speed. In each of the above mentioned ranges, a line pressure $P_L$ from a line pressure circuit 12 is allowed to output from the corresponding one of the output ports 10R, 10D, 10II, and 10I in accordance with the pattern shown by the following table.

| | Range | | | | | |
|---|---|---|---|---|---|---|
| Port | R | R | N | D | II | I |
| 10R | | o | | | | |
| 10D | | | | o | o | o |
| 10II | | | | | o | o |
| 10I | | | | | | o |

In the above table, the reference character "o" denotes the particular port which is supplied with the line pressure from the circuit 12. The other ports which are not denoted by the reference character "o" are connected to the drainage.

A shift valve 14 comprises a spool 14a and a spring 14b biasing the spool 14a to a spring set downshift position as illustrated by the right half thereof as viewed in FIG. 3. The spool 14a defines within the valve bore a chamber 14e adapted to be supplied with a shift pressure $P_S$. The spool 14a is movable against the spring 14b responsive to the hydraulic pressure within the chamber 14e to an upshift position as illustrated by left half thereof as viewed in FIG. 3 when the shift pressure $P_S$ is supplied to the chamber 14e. In the downshift position, the spool 14a allows an outlet port 14c to communicate with a drain port 14d, discharging hydraulic fluid from a circuit 36 connected to the outlet port 14c. In the upshift position, the spool 14a allows the outlet port 14c to communicate with an inlet port 14f, supplying hydraulic fluid from a circuit 34 connected to the inlet port 14f to the circuit 36 via the outlet port 14c.

The circuit 34 extends from the port 10D of the manual selector valve 10 to an inlet port 16f of an engine brake control valve 16. The engine brake control valve 16 comprises a spool 16a and a spring 16b biasing the spool 16a to a spring set lower position as illustrated by the left half thereof as viewed in FIG. 3. The spool 16a defines within the valve bore a chamber 16i adapted to be supplied with a hydraulic fluid pressure which builds up under the control of a solenoid 42. The spool 16a is movable against the spring 16b responsive to the hydraulic pressure within the chamber 16e to an upper position as illustrated by the right half thereof as viewed in FIG. 3 when the hydraulic fluid pressure is supplied to the chamber 16i. In the lower position, the spool 16a allows a first outlet port 16c to communicate with a second inlet port 16d which a circuit 32 extending from the port 10II is connected to, a second outlet port 16e to communicate with the first inlet port 16f, a third outlet port 16g to communicate with a drain port 16h. To the third outlet port 16g is connected a circuit 30 leading to the shifting friction element B/B. In the upper position, the spool 16a allows the first outlet port 16c to communicate with a drain port 16j, the second outlet port 16e to communicate with a drain port 16k, and the third outlet port 16g to communicate with a third inlet port 16l which the circuit 36 extending from the outlet port 14c of the shift valve 14 is connected to. The second outlet port 16e is connected to the engine brake friction element OR/C via hydraulic circuits 20 and 22 between which a pressure reduction valve 18 is fluidly disposed.

The pressure reduction valve 18 comprises a pressure regulating spool 18a and a spring 18b biasing the spool 18a to a lower position illustrated by the left half thereof as viewed in FIG. 3. The spool 18a defines within the valve bore a feedback chamber 18c connected to the circuit 22 via an orifice 26 and movable responsive to hydraulic pressure within the chamber 18c against the spring 18b to an equilibrium position as illustrated by the right half thereof as viewed in FIG. 3. In the equilibrium position as illustrated by the right half thereof as viewed in FIG. 3, the spool 18a closes both ports 18d and 18e. To the first inlet port 18d is connected the circuit 20 leading from the second outlet port 16a of the engine brake control valve 16. To the second inlet port 18e is connected a circuit 28 extending from the first outlet port 16c of the engine brake control valve 16. Since the circuit 28 communicates with the drain port 16j when the spool 16a of the engine brake control valve 16 stays in the upper position as illustrated by the right half thereof as viewed in FIG. 3, the port 18e serves also as a drain port under this condition. Under a condition where the spool 16a of the engine brake control valve 16 assumes the lower position as illustrated by the left half thereof as viewed in FIG. 3, the port 18e still serves as the drain port as long as the circuit 32 is drained when the spool 10a of the manual selector valve 10 is placed at D range as illustrated in FIG. 3. Reference is also made to the preceding table. This port 18e does not serve as the drain port any more if, under this condition, the spool 10a of the manual selector valve 10 is placed at II or I range because the line pressure $P_L$ is supplied to the circuit 28 through the circuit 32. There is arranged between the ports 18d and 18e an outlet port 18f which the circuit 22 leading to the engine brake friction element OR/C is connected to. The circuits 20 and 22 are connected to each other by a check valve 24 in a short circuit manner bypassing the pressure reduction valve 18.

Referring again to the engine brake control valve 16, the chamber 16i thereof is connected to a circuit 38 branching off from the circuit 34. Within this circuit 34, an orifice 40 is disposed. A solenoid 42 is provided at a portion of the branch circuit 38 between the orifice and the chamber 16i. The solenoid 42 includes a coil 42d, a plunger 42b, and a spring 42a biasing the plunger 42b to a spring set position as illustrated by the left half thereof where fluid communication between the circuit 38 and a drain port 42c is blocked to prevent discharge of hydraulic fluid from the circuit 38 via the drain port 42c. When the coil 42d is energized, the plunger 42b is urged for upward movement against the spring 42a to open the fluid communication between the circuit 38 and the drain port 42c, allowing the discharge of hydraulic fluic from the circuit 388 via the drain port 42c.

ON/OFF (Energization/Deenergization) of the coil 42d is controlled by an engine brake switch 44 which may be manually operated by a driver. The engine brake switch 44 is operatively connected to the manual selector valve 10 to be closed when the spool 10a is placed at II range of I range. The coil 14a is connected to a battery 46 via the switch 44.

The operation is hereinafter described.

When a driver places the spool 10a of the manual valve 10 at D range as illustrated in FIG. 3 and leaves the engine brake switch 44 open as illustrated in FIG. 3, reflecting the driver's intention that he/she does not wish engine braking to be effected, the line pressure $P_L$ is supplied to the circuits 34 and 38 via the port 10D. Since the plunger 42b assumes the position as illustrated by the left half thereof as viewed in FIG. 3 where the communication between the circuit 38 and the drain port 42c is blocked, the line pressure $P_L$ reaches the chamber 16i through the circuit 38, urging the spool 16a of the engine brake control valve 16 to the position as illustrated by the right half thereof as viewed in FIG. 3. In this position of the spool 16a, the line pressure $P_L$ having reached the port 16f through the circuit 34 is blocked and the circuit 20 is allowed to communicate with the drain port 16k. Since the circuit 20 is not pressurized, no hydraulic fluid pressure is supplied to the engine brake friction element OR/C, leaving it deactivated.

The line pressure $P_L$ is supplied to the port 14f of the shift valve 14, too. If, under this condition, the shift pressure $P_S$ supplied to the chamber 14e is low to allow the spool 14a to assume the downshift position as illustrated by the right half thereof as viewed in FIG. 3, the port 14f is blocked and the circuit 36 is allowed to communicate with the drain port 14d. This causes the circuit 30 communicating with the circuit 36 via the ports 16l and 16g to be depressurized, leaving the shifting friction element B/B deactivated. As a result, the 4th speed is not established. Although not shown in FIG. 3, there is a hydraulic valvular network communicating with the port 10D for receiving the line pressure $P_L$ and distributing this pressure to selected one/ones of friction elements which cooperate with each other go establish any desired one of the 1st, 2nd and 3rd speeds (see FIG. 2). Thus, the 1st, 2nd or 3rd speed is established under this condition.

As the shift pressure $P_S$ supplied to the chamber 14e rises, the spool 14a of the shift valve 14 is urged upward to assume the upshift position as illustrated by the left thereof, as viewed in FIG. 3. In this position of the spool 14a, the drain port 14d is blocked and the port 14e is allowed to communicate with the port 14f supplied with the line pressure $P_L$. This causes the line pressure $P_L$ to reach the shifting friction element B/B via the circuits 36 and 30, activating the shifting friction element B/B. Under this condition, the engagement of the shifting friction element B/B causes establishment of the 4th speed in cooperation with engagement of other two friction elements F/C and H/C (see FIG. 2). In this embodiment, the 4th speed provides an overdrive.

When the driver wishes engine braking and causes the engine brake switch 44 to be closed, the coil 42d is energized to urge the plunger 42b to assume the position as illustrated by the right half thereof where the drain port 42c is allowed to communicate with the circuit 38 downstream of the orifice 40. This causes the hydraulic fluid to be discharged from the chamber 16i, depressurizing same. As a result, the spool 16a of the engine brake control valve 16 is allowed to assume the lower position as illustrated by the left half thereof where the circuit 30 is allowed to communicate with the drain port 16h, deactivating the shifting friction element B/B, while the circuit 20 is allowed to communicate with the circuit 34 via the ports 16e and 16f, causing the line pressure $P_L$ to be supplied from the circuit 34 to the circuits 20 and 22, activating the engine brake frictrion element OR/C. As a result, the automatic transmission shifts down to the 3rd speed and effects engine braking operation.

In this lower position of the spool 16a of the engine control valve 16, the circuit 28 is allowed to communicate via the ports 16c and 16d with the circuit 32 which in turn communicates with the port 10II of the manual selector valve 10. Since the port 10II is a drain port when the spool 10a of the manual selector valve 10 is placed at the D range, the port 18e of the pressure reduction valve 18 is open to the atmosphere at the port 10II, thus serving as a drain port of the pressure reduction valve 18. As a result, the pressure reduction valve 18 operates to effect pressure reduction on the line pressure $P_L$ supplied to the port 18d to provide a reduced pressure at the port 18f that is used for activating the engine brake friction element OR/C. Initially the spool 18a of the pressure reduction valve 18 stays in the lower position as illustrated by the left half thereof as viewed in FIG. 3 so that an increase in hydraulic fluid pressure at the port 18d is directly transmitted to he port 18f, causing the hydraulic fluid pressure within the circuit 22 to increase. This increase in the hydraulic fluid pressure within the circuit 22 is fed back via the orifice 26 to the chamber 18c, urging the spool 18a upwards against the bias of the spring 18b. The fluid hydraulic pressure within the circuit 22 keeps on increasing until the spool 18a of the pressure reduction valve 18 reaches the equilibrium state position as illustrated by the right half thereof where the force with which the spool 18a is urged against the spring 12b balances with the bias force of the spring 18b. A further increase in hydraulic fluid pressure urging the spool 18a beyond the equilibrium state position causes the hydraulic fluid to be discharged from the circuit 22 toward the drain port 18e, thus suppressing such hydraulic pressure increase. As a result, the hydraulic fluid pressure supplied to the engine brake friction element OR/C through the circuit 22 results from reducing the line pressure $P_L$ to a level corresponding to the bias force of the spring 18b. With this reduced hydraulic pressure, the engine brake friction element OR/C is activated or engaged without any substantial shocks, thus suppressing a so-called engine brake shock. This is attribute to the fact that the capacity of the engine brake friction element OR/C is adjusted to the required capacity thereof under this condition.

In the case where the driver wishes engine braking during running with the 2nd speed or the 1st speed, what the driver has to do is to place the spool 10a of the manual selector valve 10 at II range or I range. This results in closing of the engine brake switch 44, thus causing the shifting friction element B/B to be deactivated and the engine brake friction element OR/C to be activated. As will be understood from the preceding table, the line pressure $P_L$ is supplied to the ports 10II and 10I when the spool 10a is placed at II range, while it is supplied to the port 10I when the spool 10a is placed at I range. The line pressure $P_L$ from the port 10I is supplied to an appropriate valvular network, not shown, to cause the transmission to establish the 2nd speed state, while the line pressure from he port 10I is supplied to an appropriate valvular network, not shown, to cause the transmission to establish the 1st speed. Thus, there is provided engine braking during running with the 2nd speed when the spool 10a is placed at II range, while there is provided engine brake during running with the 1st speed when the spool 10a is placed at I range.

During operation with the II range or I range selected, the line pressure appearing at the port 10II is supplied through the circuit 32, ports 16d, 16c, the circuit 28 to the port 18e of the pressure reduction valve 18. Under this condition, since the port 18e does not serve as the drain port, the pressure reduction valve 18 terminates the pressure reduction which has been previously described. Thus, the line pressure $P_L$ is supplied to the engine brake friction element OR/C via the circuit 22. The pressure reduction valve 18 operates as follows. Even if the spool 18a of the pressure reduction valve 18 is urged upwards against the spring 18b beyond the position as illustrated by the right half thereof to uncover the port 18e, the hydraulic fluid is not discharged from the port 18e but the hydraulic fluid is supplied from this port 18e to the circuit 22, causing the hydraulic pressure therein to the level as high as the line pressure $P_L$. Thus, the capacity of the engine brake friction element OR/C during engine brake running with the 1st speed or the 2nd speed becomes larger than the capacity thereof during engine brake running with the 3rd speed. As a result, the occurrence in slip during engine braking running with the 1st speed or 2nd speed is prevented.

The hydraulic fluid is discharged from the engine brake friction element OR/C to the drain port 16k to deactivate or release the engine brake friction element OR/C upon driver's placing the spool 10a of the manual valve 10 at D range or opening the engine brake switch 44 is opened to terminate engine braking running. During this transition, the hydraulic fluid is quickly discharged from the engine brake friction element OR/C to the drain port 16k via the one-way check valve 24 bypassing the pressure reduction valve 18, thus assuring a quick release from engine braking operation.

What is claimed is:

1. In an automatic transmission for an automotive vehicle having an engine, the automatic transmission including an engine brake friction element which is to be activated to effect engine braking during operation with each of various speeds, a capacity required by the engine brake friction element to effect engine braking during operation with the highest one of the various speeds being smaller than a capacity required by the engine brake friction element to effect engine braking during operation with another of the various speeds, an engine brake control comprising:

means for causing the automatic transmission to shift to the highest one of the various speeds to effect engine braking during operation with the highest one of the various speeds by hydraulically activating the engine brake friction element when a first predetermined drive range is selected and causing the automatic transmission to shift to another of the various speeds to effect engine braking during operation with the other of the various speeds by hydraulically activating the engine brake friction element when a second predetermined drive range is selected;

means for effecting pressure reduction on hydraulic fluid pressure supplied to the engine brake friction element for activation thereof by discharging hydraulic fluid from said engine brake friction element; and means for rendering said pressure reduction effecting means inoperative to prevent discharging of hydraulic fluid from said engine brake friction element when said second predetermined drive range is selected, whereby hydraulic fluid pressure which is not subject to the pressure reduction is supplied to the engine brake friction element for activation thereof when said second predetermined drive range is selected.

2. In an automatic transmission for an automotive vehicle having an engine, the automatic transmission being shiftable between an nth speed, an n−1th speed and an n−2th speed, the automatic transmission including an engine brake friction element which is to be activated to effect engine braking during operation with each of the n−1th speed and the n−2th speed, a capacity required by the engine brake friction element to effect engine braking during operation with the n−1th speed being smaller than a capacity required by the engine brake friction element to effect engine braking during operation with the n−2th speed, an engine brake control comprising:

means for causing the automatic transmission to shift to the n−1th speed to effect engine braking during operation with the n−1th speed by hydraulically activating the engine brake friction element when a first predetermined drive range is selected and causing the automatic transmission to shift to the n−2th speed to effect engine braking during operation with the n−2th speed by hydraulically activating the engine brake friction element when a second predetermined drive range is selected;

means for effecting pressure reduction on hydraulic fluid pressure supplied to the engine brake friction element for activation thereof by discharging hydraulic fluid from said engine brake friction element; and means for rendering said pressure reduction effecting means inoperative to prevent discharging of hydraulic fluid from said engine brake friction element when said second predetermined drive range is selected, whereby hydraulic fluid pressure which is not subject to the pressure reduction is supplied to the engine brake friction element for activation thereof when said second predetermined drive range is selected.

3. An engine brake control as claimed in claim 2, wherein said means for effecting pressure reduction includes a drain port via which the hydraulic fluid is discharged from the engine brake friction element.

4. An engine brake control as claimed in claim 3, wherein said means for rendering said pressure reduction effecting means inoperative comprises a manual selector valve including a port and a valve spool that is moved when said second predetermined drive range is selected to a predetermined position where a predetermined hydraulic pressure is generated at said port;

means for generating an engine brake command signal when said second predetermined drive range is selected;

an engine brake control valve including a valve spool movably responsive to said engine brake command signal to a predetermined position where it allows said drain port of said means for effecting pressure reduction to communicate with said port of said manual selector valve, allowing supply of said predetermined hydraulic pressure to said drain port.

5. In an automatic transmission for an automotive vehicle having an engine, the automatic transmission including an engine brake friction element, the automatic transmission establishing an engine brake running condition where the engine can be driven by the automotive vehicle;

a source of servo actuating hydraulic fluid pressure;

a manual valve manually operable to assume a plurality of forward drive range positions including a predetermined drive range position;

means for generating a signal indicative of demand for engine brake running;

an engine brake control valve means responsive to said signal for supplying said servo actuating hydraulic fluid pressure to the engine brake friction element when said manual valve assumes one of said plurality of forward drive range position;

a pressure reduction valve means fluidly disposed between said engine brake control valve means, said pressure reduction valve means being rendered operative when said manual valve assumes said predetermined drive range position for discharging hydraulic fluid from the engine brake friction element to reduce hydraulic fluid pressure acting on the engine brake friction element; and means cooperating with said engine brake control valve means for rendering said pressure reduction valve means inoperative to cause said servo actuating hydraulic fluid pressure to be supplied without any hydraulic fluid pressure discharged when said manual valve assumes one of said forward drive range positions excluding said predetermined drive range position.

* * * * *